(12) United States Patent
Gimena (10) Patent No.: US 9,039,017 B2
(45) Date of Patent: May 26, 2015

(54) ROLLER SKATING APPARATUS (71) Applicant: Pedro Gimena, West Roxbury, MA (US)

(72) Inventor: Pedro Gimena, West Roxbury, MA (US)

( * ) Notice: Subject to any disclaimer, the term of this patent is extended or adjusted under 35 U.S.C. 154(b) by 0 days.

(21) Appl. No.: 13/897,671

(22) Filed: May 20, 2013

(65) Prior Publication Data
US 2014/0217686 A1 Aug. 7, 2014

Related U.S. Application Data (60) Provisional application No. 61/759,556, filed on Feb. 1, 2013.

(51) Int. Cl.
*A63C 1/28* (2006.01)
*A63C 1/30* (2006.01)
*A41D 19/00* (2006.01)
*B60B 19/00* (2006.01)
*B62B 11/00* (2006.01)
*A63B 71/14* (2006.01)
*A63C 1/00* (2006.01)
*A63C 17/00* (2006.01)

(52) U.S. Cl.
CPC .............. *A63C 1/30* (2013.01); *A41D 19/0024* (2013.01); *B60B 19/00* (2013.01); *B62B 11/00* (2013.01); *A63B 71/141* (2013.01); *A63C 1/00* (2013.01); *A63B 2244/18* (2013.01); *A63C 17/0026* (2013.01)

(58) Field of Classification Search
USPC ........... 280/809, 11.12, 11.221, 11.18, 11.16; 2/160, 161.1
See application file for complete search history.

(56) References Cited

U.S. PATENT DOCUMENTS

| | | | | |
|---|---|---|---|---|
| 4,190,902 A | * | 3/1980 | Rhee | 2/16 |
| 5,373,584 A | * | 12/1994 | Parcells, III | 2/465 |
| 5,459,878 A | * | 10/1995 | Gold | 2/161.1 |
| 5,526,531 A | * | 6/1996 | Olson et al. | 2/16 |
| 5,722,092 A | * | 3/1998 | Borzecki et al. | 2/16 |
| 5,794,275 A | * | 8/1998 | Donzis | 2/455 |
| 5,938,240 A | * | 8/1999 | Gairdner | 280/826 |
| 5,953,752 A | * | 9/1999 | Jones | 2/16 |
| 7,669,251 B2 | * | 3/2010 | Hammons et al. | 2/161.1 |
| 2010/0148459 A1 | * | 6/2010 | Johnston | 280/87.01 |
| 2010/0216615 A1 | * | 8/2010 | Rios et al. | 482/142 |

* cited by examiner

*Primary Examiner* — Jeffrey J Restifo
(74) *Attorney, Agent, or Firm* — Bay State IP, LLC

(57) ABSTRACT

A hand ice skating mechanism in conjunction with an athletic protective mechanism utilizing a glove portion including a front portion and a rear portion, wherein the rear portion includes a blade retaining portion and a blade assembly in communication with the blade retaining portion.

6 Claims, 7 Drawing Sheets

ROLLER SKATING APPARATUS

CROSS REFERENCE TO RELATED APPLICATION

This application claims the benefit of and takes priority from U.S. Patent Application Ser. No. 61/760,339 filed on Feb. 4, 2013, the contents of which are hereby incorporated by reference.

FIELD OF THE INVENTION

The present system relates generally to protective wear for hands and arms and more particularly to protective mechanisms such as gloves with nominal friction devices such as blades.

BACKGROUND OF THE INVENTION

Ice skates are boots with blades attached to the underside that are used to more readily propel oneself across sheets of ice. Developed in Finland several millennia ago, ice skates were originally crafted from the bones of animals and bound to a user's foot with leather straps. These skates allowed the native Finns to conserve energy while out on long hunts or travels. Over the course of many years, a metal blade design was eventually adopted. The oldest metal blade ice skate recovered was found in Scandinavia and dates back to 200 A.D.

Today there are a variety of different ice skate designs, each with its own unique intended purpose. While the most common types of ice skates are figure skates and hockey skates, there also exist racing skates, touring skates and bandy skates. As the design and use of ice skates has greatly improved over the years, they seem to have reached a plateau in terms of innovation.

SUMMARY OF THE INVENTION

The instant apparatus and system, as illustrated herein, is clearly not anticipated, rendered obvious, or even present in any of the prior art mechanisms, either alone or in any combination thereof. The versatile system, method and series of apparatuses for creating and utilizing a system for protection of a user's arms during ice skating are illustrated. Thus the several embodiments of the instant apparatus are illustrated herein.

It is therefore an object of the present invention to provide an ice skate that is worn on one's hand as a glove or mitten.

It is a further of the invention to provide an ice skate glove with a collapsible blade that may be switched between an extended position and a collapsed position.

It is another object of the present invention to utilize a locking mechanism to ensure that the ice skate blade remains in place.

It is yet another of the present invention to provide a release mechanism that is used to switch positions of the blade.

It yet another object of the present invention to provide a padded support that extends to the wearer's arm.

The invention results from the realization that the act of ice skate will be revolutionized by an ice skate that may be work on a user's hand. In this way, a user may use both their feet and hands to skate along the ice.

There has thus been outlined, rather broadly, the more important features of the embodiments in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

To the accomplishment of the foregoing and related ends, certain illustrative aspects are described herein and these aspects are indicative of the various ways in which the principles disclosed herein may be practiced and all aspects and equivalents thereof are intended to be within the scope of the claimed subject matter.

BRIEF DESCRIPTION OF THE DRAWINGS

Advantages of the present apparatus will be apparent from the following detailed description of exemplary embodiments thereof, which description should be considered in conjunction with the accompanying drawings, in which: Having thus described the invention in general terms, reference will now be made to the accompanying drawings, which are not necessarily drawn to scale, and wherein.

DETAILED DESCRIPTION OF THE PREFERRED EMBODIMENTS

The detailed description set forth below is intended as a description of presently preferred embodiments of the invention and does not represent the only forms in which the present invention may be construed and/or utilized. The description sets forth the functions and the sequence of the steps for producing the invention. However, it is to be understood that the same or equivalent functions and sequences may be accomplished by different embodiments also intended to be encompassed within the scope of the invention.

In reference to FIGS. 1-6, an ice skate glove 10 is comprised of a body 12. The body 12 may be made from any material or combination of materials including, but not limited to, nylon, silk, leather, steel, rubber, aluminum, cotton, plastic or fiber glass. In a preferred embodiment of the present invention, the body 12 is shaped like a glove; however, the body 12 may also be shaped like a mitten. It is also possible for the body 12 to be fingerless. Additionally, it is possible for one or more of the fingers to be attached to one another such that they move in unison. The body 12 may be any size.

The body 12 is further comprised of an attachment portion 18. In a preferred embodiment of the present invention, the attachment portion 18 encompasses the palm area of a user's hand while wearing the ice skate glove. However, it is also possible for the attachment portion 18 to encompass a portion or the entirety of one or more fingers of a user's hand. The attachment portion 18 is made of a rigid material as to provide a base for at least one blade 14. In this way the attachment portion 18 also provides support for a user's hand while the ice skate glove is in use.

The attachment portion 18 is further comprised of a pair of blade mounts 20. The pair of blade mounts 20 is located coaxially along the attachment portion 18. A cavity 34 cut into each blade mount encompasses opposing ends of the attachment hinge of the blade. Each of the pair of blade mounts 20 is further comprised of a locking mechanism 22. The locking mechanisms 22 lock the blade 14 in both the extended position and the collapsed position. Any type of locking mechanism 22 may be used including, but not limited to, a slip joint, liner lock or lock back mechanism. The locking mechanism 22 may also be located anywhere else on the attachment portion 18 of the body 12. It is also possible for individual locking mechanisms 22 to be used to secure the blade 12 in the extended position and the collapsed position. In a preferred embodiment of the present invention, a release mechanism 24 located on each blade mount 20 is used to disengage the lock ins of the attachment hinge 18 from the locking mechanisms 22 of the blade mounts 20. It is also possible for the release mechanisms 24 to be located anywhere else and for one release mechanism 24 to be used.

The body 12 may also feature a strap 36 along the wrist portion. The strap 36 is used to tighten the opening of the body 12 around the user's wrist such that the ice skate glove 10 does not slip off of a user's hand while in use. The strap 36 may be secured using Velcro, buttons, snaps, ties or any other means of attachment.

The ice skate glove 10 is also comprised of a blade 14. The blade 14 may be made from any material combination of materials including, but not limited to, steel, aluminum or fiber glass. The blade 14 may be designed such that it is any size. The blade 14 is further comprised of a pair of cutting edges 26, a finger pick 28 and an attachment hinge 30. The pair of cutting edges 26 is formed by a crescent shaped cut that is made along the length of the side of the blade that comes in contact with the ice. The pair of cutting edges 26 provides sharp edges that allow the user to readily maneuver about the ice. It is also possible for no cut to be made along the length of the blade such that the pair of cutting edges is formed by right angles.

The blade 14 is further comprised of a finger pick 28. The finger pick 28 is located on the curved portion of the blade 14, adjacent to the pair of cutting edges 26. The finger pick 28 is formed from a plurality of triangular extrusions 38. The plurality of triangular extrusions 38 protrudes from the curved portion of the blade 14 and allows a user to perform various maneuvers such as jumps, pivots and spins. The finger pick 28 may additionally be used to provide a stopping force.

The attachment hinge 30 is located on the side of the blade opposite of the pair of cutting edges. The attachment hinge 30 is a square-like extrusion that runs lengthwise along the blade. One edge of the square-like extrusion is rounded. The rounded edge allows the attachment hinge 30 to rotate between a ninety degree angle from the extended position to the collapsed position. It is also possible for the attachment hinge 30 to be designed such that may rotate at an angle less than or greater than ninety degrees. The attachment hinge 30 engages each of the pair of blade mounts 20 and allows the blade 14 to pivot between an extended position and a collapsed position.

The attachment hinge 30 is further comprised of a pair of lock pins 32. The pair of lock pins 32 are extrusions protruding from opposing ends of the attachment hinge and are encompassed by the pair of blade mounts 20. The pair of lock pins 32 engages the locking mechanisms 22 within the pair of blade mounts 20 when the blade 14 is in the extended position and the collapsed position. In this way, the blade 14 is securely locked in position and cannot rotate.

The ice skate glove 10 is further comprised of a padded support 16. The padded support 16 can be made from any material or combination of materials including, but not limited to, rubber, plastic, metal or fiber glass. In a preferred embodiment of the present invention, the padded support 16 extends from a user's wrist to their elbow; however, the padded support 16 may be designed to cover any portion of a user's arm. The padded support 16 is designed such that it is detachable from the body 12; however, it may also be designed such that it is permanently attached. The padded support 16 may be attached to the body 12 of the ice skate glove 10 and/or the user's arm using Velcro, snaps, buttons or any other means of attachment.

In an alternative embodiment of the present system, the ice skate glove is further comprised of a second blade. The first blade attached between the ring finger and pinky finger, while the second blade is attached between the middle finger and index finger. It is also possible for the first and second blade to be mounted in any other position along the attachment portion of the body. The first and second blade may be designed such that they both collapse in the same direction or such that they collapse in opposing directions. Separate locking mechanisms may be used to lock the first and second blades in the extended and collapsed positions or a single locking mechanism may be used to control the fixed position of both blades. It is also possible for more than two blades to be used.

Figure 1:
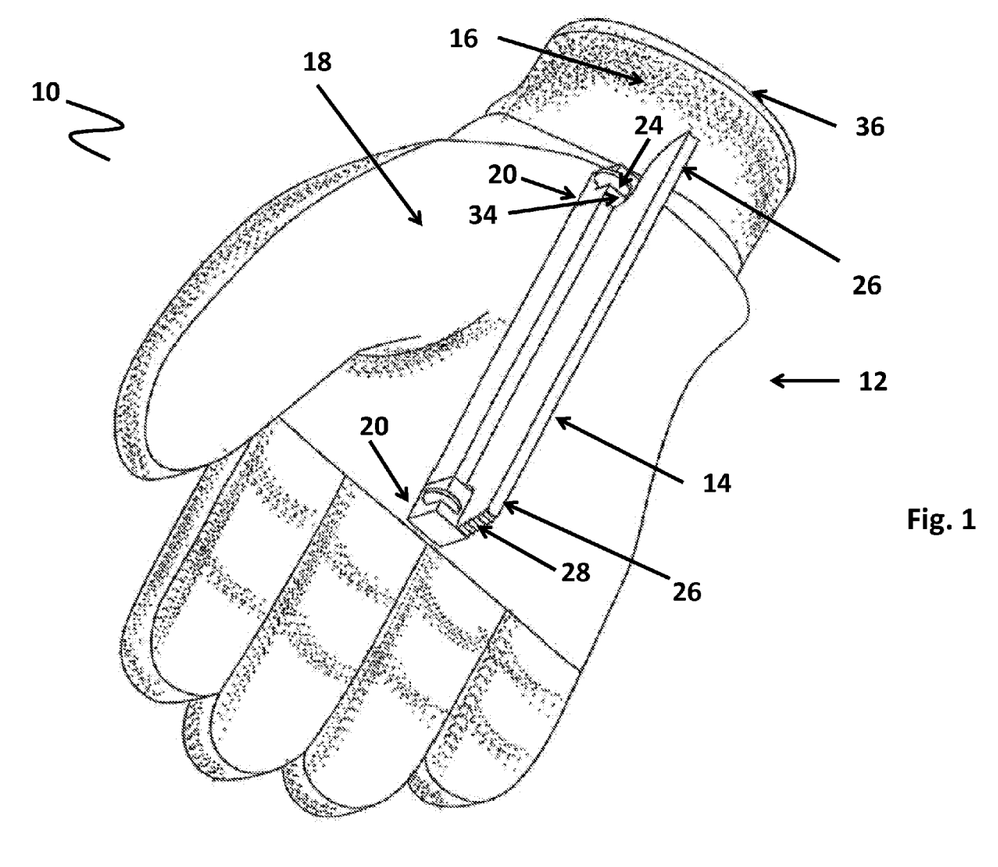
FIG. 1 is a perspective view of the ice skate glove in a preferred embodiment of the present invention.
Figure 2:
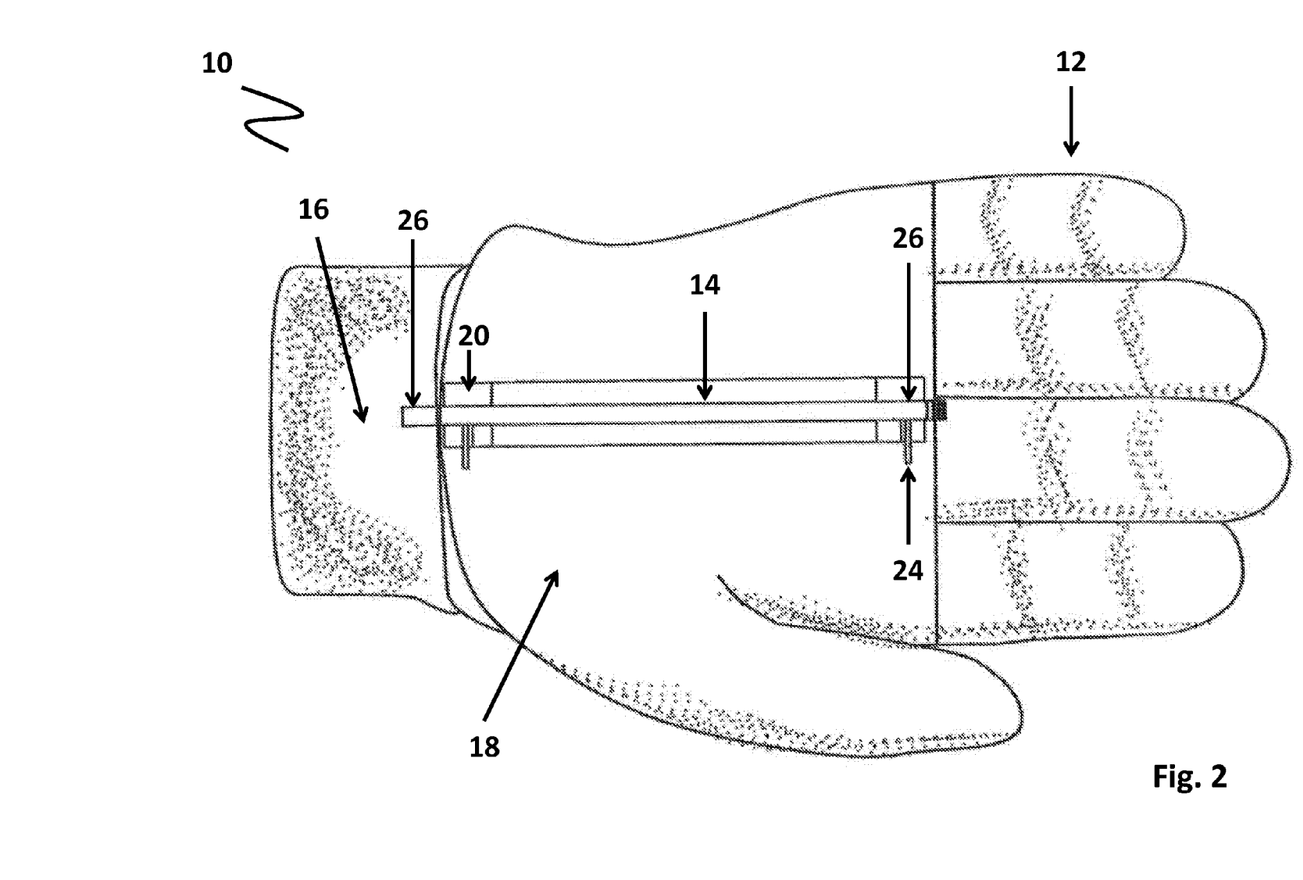
FIG. 2 is a bottom view of the ice skate glove with the blade in the extended position in a preferred embodiment of the present invention.
Figure 3:
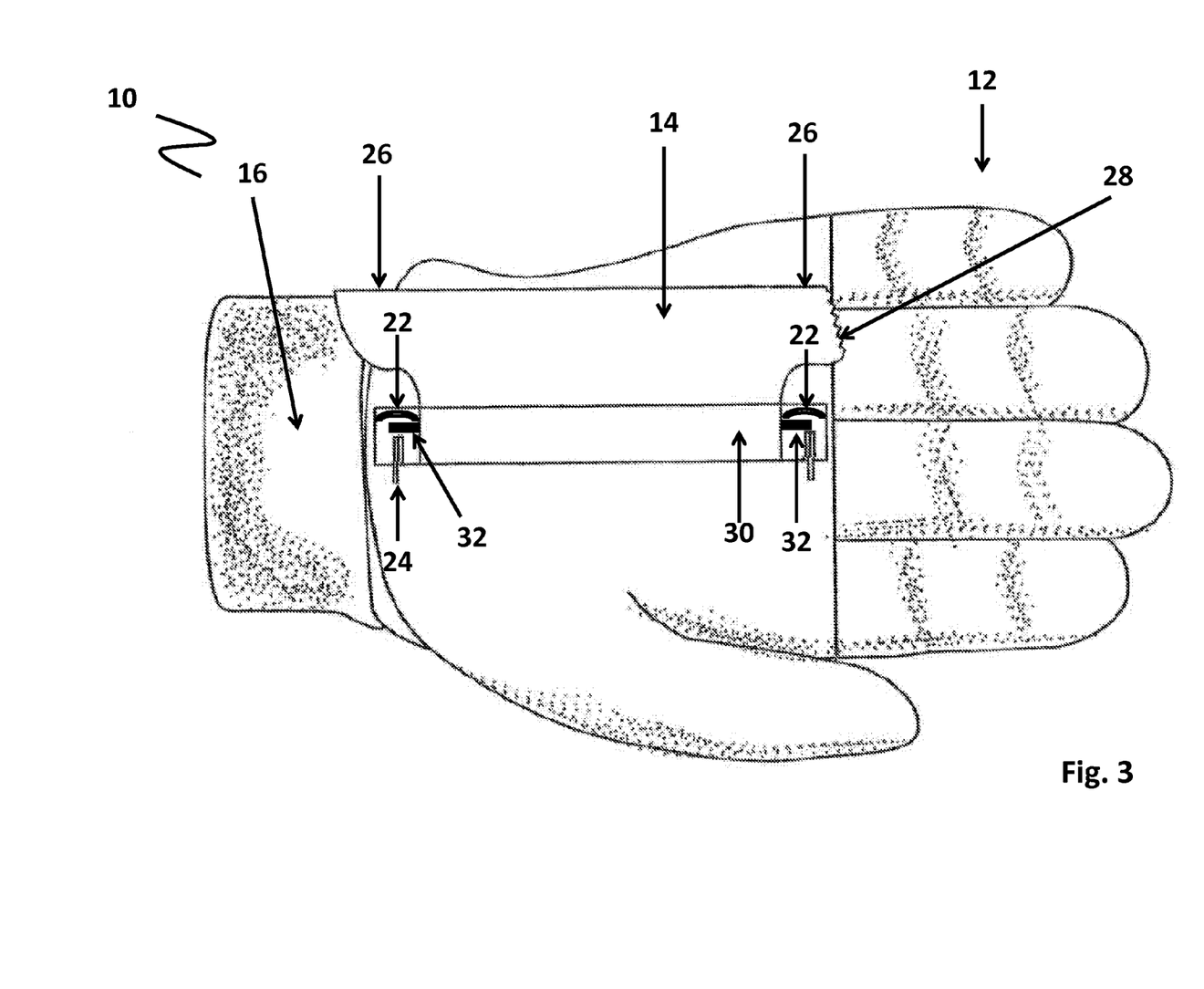
FIG. 3 is bottom sectional view of the ice skate glove with the blade in the collapsed position in a preferred embodiment of the present invention.
Figure 4:
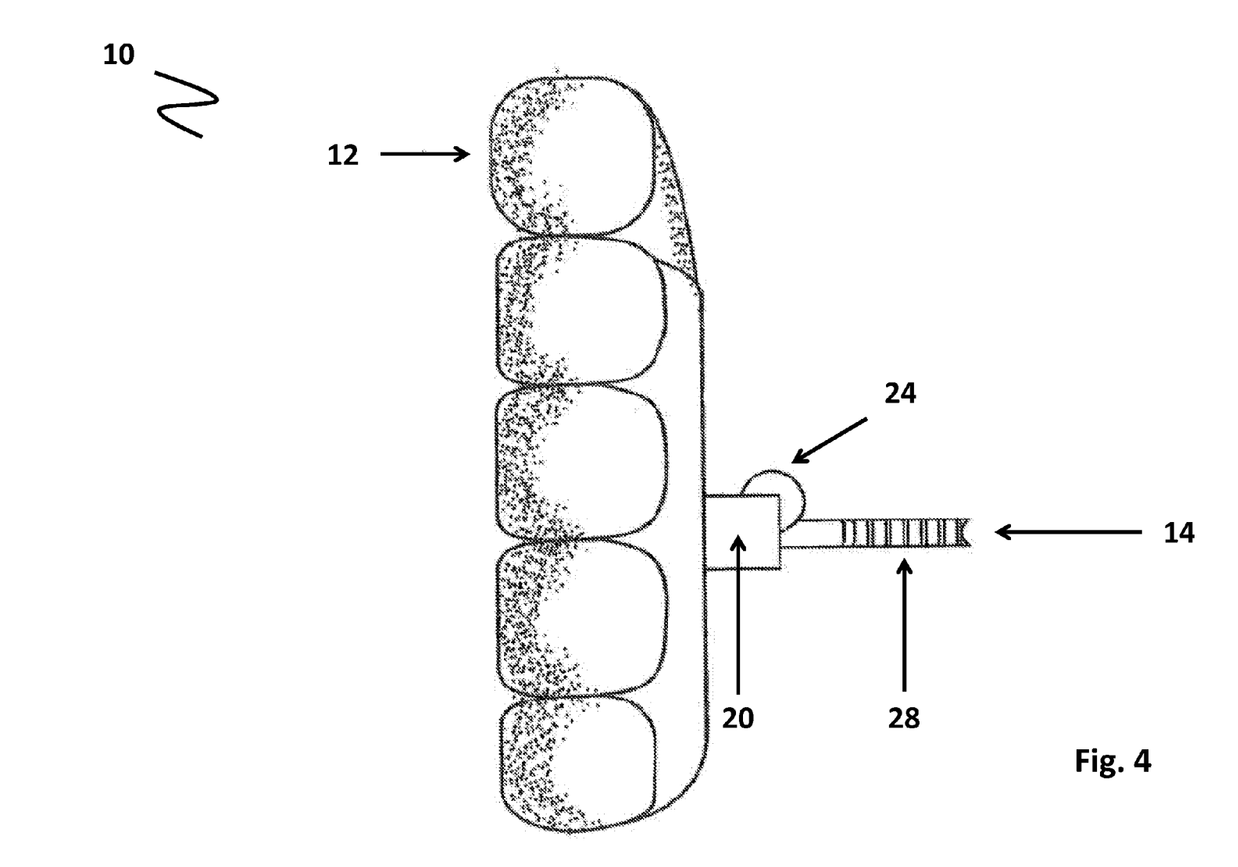
FIG. 4 is a front view of the ice skate glove with the blade in the extended position in a preferred embodiment of the present invention.
Figure 5:
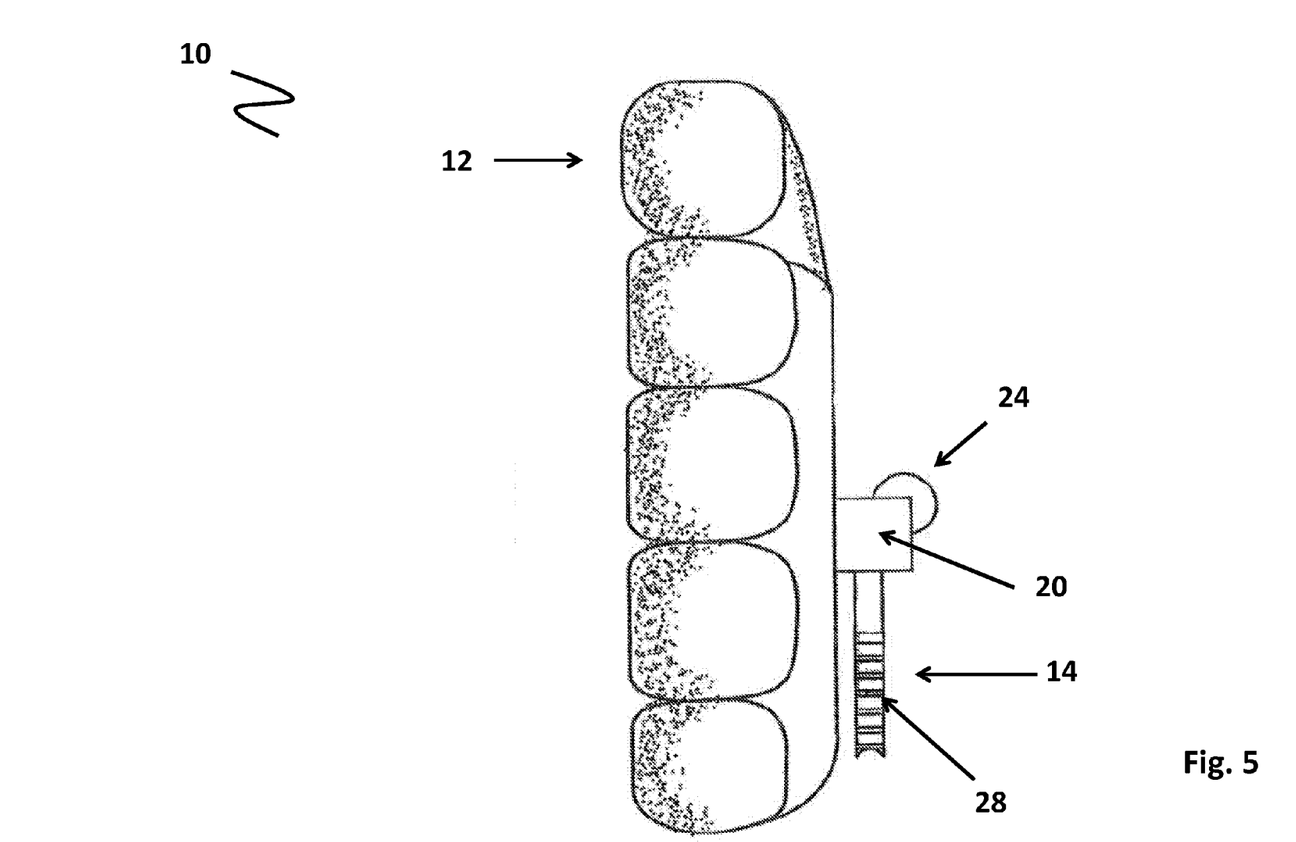
FIG. 5 is a front view of the ice skate glove with the blade in the collapsed position in a preferred embodiment of the present invention.
Figure 6:
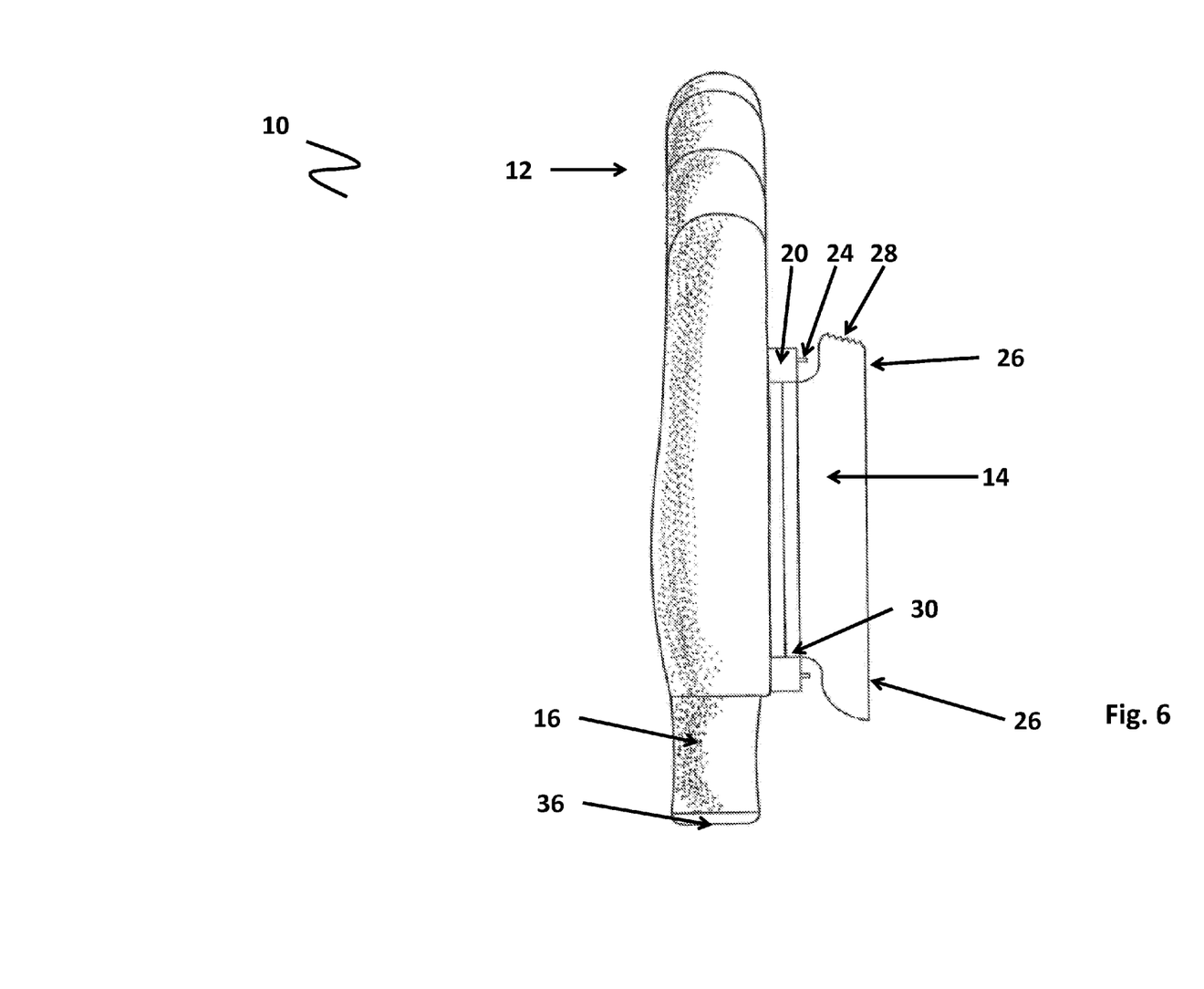
FIG. 6 is a right side view of the ice skate glove with the blade in the extended position in a preferred embodiment of the present invention.
Figure 7:
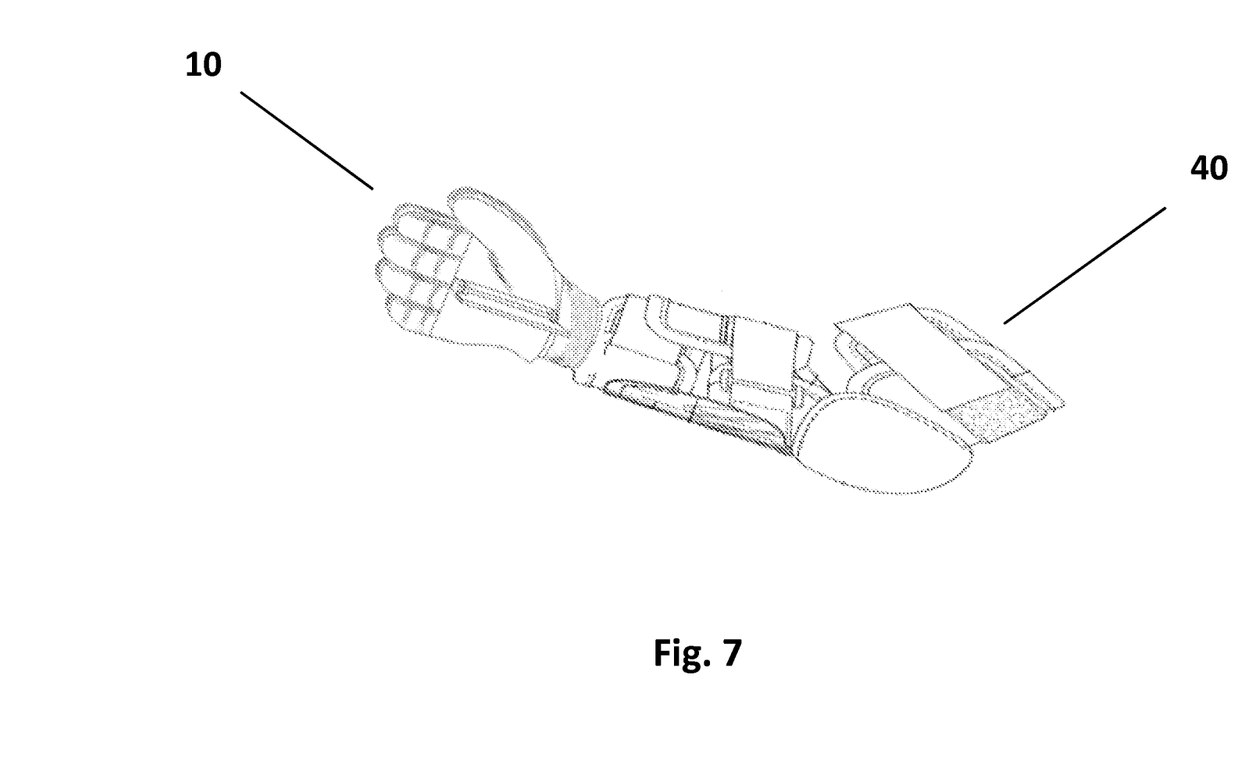
FIG. 7 is a perspective view of the ice skate glove in communication with a forearm and elbow protection device.

In an alternative embodiment of the present system, FIG. 7 illustrates a perspective view of the ice skate glove 10 in communication with a forearm and elbow protection device 40.

In conclusion, herein is presented an ice skating glove with a retractable blade for use in hand skating. The invention is illustrated by example in the drawing figures, and throughout the written description. It should be understood that numerous variations are possible, while adhering to the inventive concept. Such variations are contemplated as being a part of the present invention.

What is claimed is:
1. A glove for use in ice skating, comprising:
   at least one blade; and
   a glove, comprising a body and an attachment portion, wherein the attachment portion further comprises a pair of blade mounts, and wherein the blade mounts further comprise a locking mechanism, a release mechanism, and a cavity for receiving the blade; and wherein the at least one blade is rotatably attached to the attachment portion.

2. The glove of claim 1, wherein the attachment portion is located in the palm of the glove.

3. The glove of claim 1, further comprising a padded support for the wearer's wrist.

4. The glove of claim 1, wherein the at least one blade further comprises a pair of cutting edges, a finger pick, and an attachment hinge.

5. The glove of claim 4, wherein the attachment hinge further comprises a pair of lock pins, whereby the locking mechanism engages the lock pins to secure the blade, and the release mechanism disengages the lock pins to allow the blade to rotate.

6. The glove of claim 1 further comprising a forearm and elbow protection device.

\* \* \* \* \*